Feb. 12, 1952 J. C. ACHENBACH ET AL 2,585,717

BAND PASS AMPLIFIER

Filed Jan. 3, 1946 2 SHEETS—SHEET 1

INVENTORS
John C. Achenbach
Simeon I. Tourshou
& Donald Mackey
BY
H. S. Grover
ATTORNEY Feb. 12, 1952 J. C. ACHENBACH ET AL 2,585,717

BAND PASS AMPLIFIER

Filed Jan. 3, 1946 2 SHEETS—SHEET 2

INVENTORS
John C. Achenbach
Simeon I. Tourshou
& Donald MacKey
BY
W. S. Grover.
ATTORNEY Patented Feb. 12, 1952 2,585,717

UNITED STATES PATENT OFFICE 2,585,717

BAND PASS AMPLIFIER

John C. Achenbach, Collingswood, N. J., Simeon I. Tourshou, Philadelphia, Pa., and Donald Mackey, Haddon Heights, N. J., assignors to Radio Corporation of America, a corporation of Delaware Application January 3, 1946, Serial No. 638,780

2 Claims. (Cl. 179—171)

The present invention relates to television receivers and more particularly, although not necessarily exclusively, to a television receiving system of simplified form which does not require the use of separate filter networks for response curve shaping and rejection of undesired signal components.

The invention is particularly applicable to the reception of vestigial side band television signals but is not so limited. This system of vestigial side band television transmission is discussed in a paper by Poch and Epstein, entitled "Partial suppression of one side band in television reception," RCA Review, volume I, page 19, 1937. Television receivers, heretofore provided for receiving image signals and sound signals transmitted on an adjacent carrier, have included amplifier stages which involved filter networks having variable elements requiring critical adjustment. In the present invention, such types of filter networks are entirely eliminated, and a simplified inter-stage coupling arrangement is substituted having a minimum of adjustable elements which are adjustable in a manner similar to that now familiar to servicemen and others accustomed to servicing and adjusting the usual broadcast receiver. Accordingly, the primary object of the present invention is to provide a television receiver having an amplifying system which is devoid of complication.

Another object of the invention is to provide an intermediate frequency amplifier for a television receiver having means for sharply attenuating unwanted signals.

A further object of the invention is to provide an interstage coupling device for a television receiver which serves as a combined band pass filter and wave trap.

Other objects and advantages of the present invention will, of course, become apparent and immediately suggest themselves to those skilled in the art to which the invention is directed from a reading of the following specification in connection with the accompanying drawings in which.

Figures 1, 2:
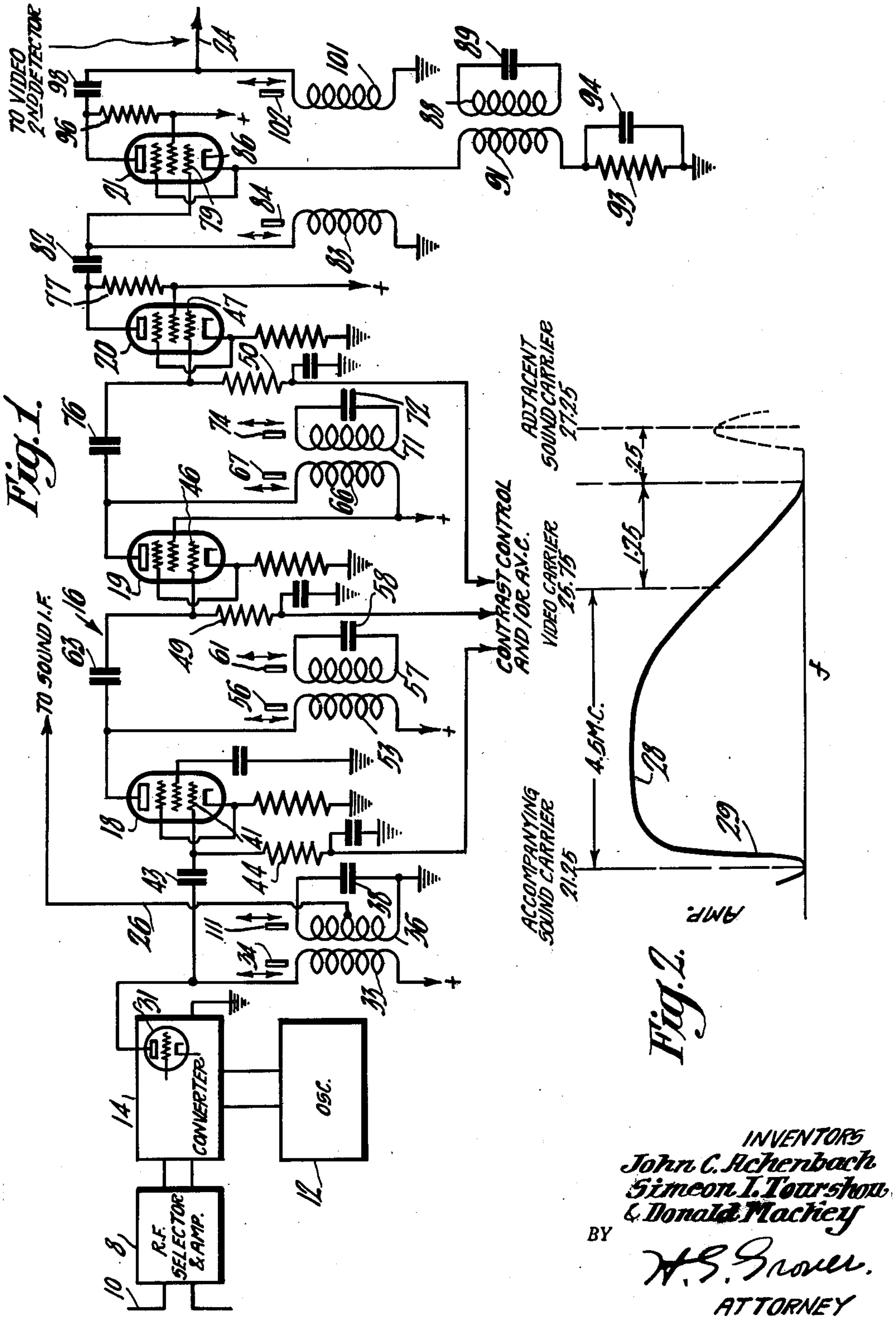
Fig. 1 is a circuit and block diagram of a television receiver amplifier embodying the invention.
Fig. 2 is a response curve referred to in explaining the operation of the apparatus of Fig. 1.

Referring to Fig. 1, there are shown the principal elements of the image intermediate frequency channel of a television receiver. Details of the receiver generally are not shown inasmuch as they are not relevant to a complete understanding of the present invention, and complete details are by now well known and descriptions thereof have appeared in the literature and in issued patents. For example, a television receiver is shown diagrammatically in Fig. 21 of United States Patent No. 2,192,121, granted to A. V. Bedford, February 27, 1940, and also is shown by Carlson United States Reissue Patent No. 20,700, dated April 19, 1938. The receiver, the principal elements of which are shown in Fig. 1, is of the superheterodyne type comprising a radio frequency selector and amplifying stage 8 fed, for example, from a communication channel, a transmission line, or an antenna as indicated at 10. The portion of the apparatus designated by the reference character 8 may include the signal selector described and claimed in the copending application of J. C. Achenbach, Serial No. 606,807, filed July 24, 1945, now abandoned. The receiver also includes the usual tunable oscillator 12 and a converter or mixer stage 14.

The intermediate frequency amplifier indicated in its entirety by reference character 16 embodies the components of this invention and is seen to comprise four stages of intermediate frequency amplification provided by vacuum tubes 18 to 21 with their associated coupling devices. The output of this intermediate frequency amplifier is or may be furnished over a connection 24 to a second detector which feeds a video amplifier, and an image producing device, none of these parts being shown. In a manner to be explained, the intermediate frequency sound signals usually comprising a frequency deviated (wave length modulated) carrier and its side bands are furnished over a connection 26 to a sound I. F. channel (not shown).

The portion of the frequency spectrum allotted to television channels is subdivided so that the transmitted television signal comprises a carrier wave with one complete side band, such as the upper side band, and a part of the lower side band. The accompanying sound signal comprising the modulated carrier is usually located on the high frequency side of the television signal. Referring to Fig. 2 which indicates a desired response curve for an intermediate frequency amplifier, the accompanying sound signal is transmitted by a carrier which, after conversion, for example in the converter 14, lies closely adjacent to modulation components which must be passed by the intermediate frequency amplifier. Therefore, the response curve 28 must slope abruptly, as indicated at 29, so that the attenuation of sound signals will be substantially complete. Also, the sound signal from the adjacent television channel must be removed. Solely by way of example, certain intermediate frequency values are indicated on Fig. 2. The video signal carrier, the carrier which is modulated with the desired sound accompaniment and the sound carrier of an adjacent channel are indicated by Fig. 2. It has been assumed in constructing Fig. 2 that the frequency of the oscillator 12 is such that the position of the carriers is inverted. The configuration of curve 28 is obtained by constructing and tuning the successive stages of the amplifier 16 in a manner now to be explained. The converter 14 includes or consists of a tube 31, the plate or output circuit of which is coupled to the tube 18 by an inductance 33 which is tuned by tube and circuit capacitance. The tuning is adjustable by means of a movable core 34 of magnetic material such as powdered or comminuted iron or the like. A wave trap comprising an inductance 36 and a capacitor 38 is tightly coupled to the coil 33. The elements 36 and 38 constitute a trap circuit for the sound intermediate frequency signal and this trap circuit is preferably tuned to resonance at the frequency of the I. F. sound carrier.

The connection 26 is made to a tap on the inductance 36 to reduce loading on the rejection circuit comprising the inductance 36 and the capacitance 38. The tuned circuit, which includes the inductance 33, is preferably tuned to resonate at a frequency less than the I. F. video carrier. In the illustrative example of an I. F. amplifier 16 having a characteristic such as shown in Fig. 2, this circuit is preferably tuned to a frequency of 21.75 mc. (megacycles).

The signal grid 41 of the amplifying tube 18 is coupled to the plate of the converter tube 31 through a coupling condenser 43. The grid 41 is returned by way of a load resistor 44 to a suitable biasing source which may be a potentiometer (not shown) serving as a contrast control or a source of AVC voltage. A suitable arrangement for providing an AVC voltage is disclosed in United States Patent No. 2,569,289 granted to Edwin L. Clark on September 25, 1951. In a like manner, the signal grids 46 and 47 of the tubes 19 and 20, respectively, are connected by load resistors 49 and 50 to the biasing source which is in communication with the grid 41 by way of the load resistor 44. It will be understood by those skilled in the art that the connections to the load resistors 44, 49, and 50 may include suitable filtering means and that the load resistors limit the "Q" of the tuned circuits to the desired value. Q is "figure of merit" of a circuit and generally represents the ratio of the circuit reactance to its resistance.

As previously stated, the interstage coupling between the tubes 31 and 18 constitutes not only a band pass filter for the desired video or image intermediate frequency signal but serves also as a trap and filter for the recovery of the desired sound intermediate frequency signal. The signal appearing on the grid 41 furnished by the coupling condenser 43 is amplified by the tube 18 in the plate circuit of which is an inductance 53 forming one element of the tuned circuit. As explained before in connection with the inductance 33, the other tuning element is comprised of the inter-electrode capacities of the tubes 18 and 19 and other circuit capacities. The tuned circuit provided by the inductance 53 is adjusted by means of a magnetic core 56 which is or may be similar to the previously mentioned core 34. The tuned circuit provided by the inductance 53 is preferably adjusted to resonance at a frequency which is relatively close to the video or image I. F. carrier. By way of example, it may be tuned to a frequency of 25.36 mc. A tightly coupled high "Q" trap is provided by an inductance 57 shunted by a capacitance 58. Tuning of this trap circuit is accomplished by a magnetic core 61. The trap circuit comprised of the elements 57 and 58 is preferably tuned to reject sound signals on the adjacent television channel which may be present as a modulated intermediate frequency carrier of relatively low amplitude at this point in the receiver. Solely by way of example, this trap may be tuned to a frequency of 27.25 mc.

The output circuit of the tube 18 is coupled to the signal grid 46 of the tube 19 by way of a coupling condenser 63. The plate or output circuit of the tube 19 includes an inductance 66 which, in conjunction with tube and circuit capacities, is resonant to a frequency which is closely adjacent to the frequency to which the converter plate circuit is tuned, adjustment being effected by a movable core 67. By way of example, this plate circuit is tuned to a frequency of 22.05 mc. A tightly coupled trap circuit is provided by an inductance 71 shunted by a capacitance 72, tuning of this combination being adjusted by a movable core 74. This last named tuned circuit which is tightly coupled, as stated, to the inductance 66 serves as a trap circuit for rejection of image signals of an adjacent television channel which at this point in the receiver will appear as an intermediate frequency signal of low amplitude. In the illustrative example, the trap circuit will be tuned to a frequency of 19.75 mc.

A coupling condenser 76 couples the plate circuit of the amplifier tube 19 to the signal grid 47 of the tube 20. The plate circuit of the tube 20 includes a loading resistor 77 which limits the circuit "Q" to the desired value, and coupling is effected from the plate circuit to the signal grid 79 of the tube 21 by way of a coupling condenser 82. The grid impedance in this instance is provided with a tuned inductance 83, tuning being accomplished as before by the inter-electrode capacities of the tubes 19 and 20 and other circuit capacities. Tuning adjustment is accomplished by a movable core 84. The resonant frequency of this tuned circuit is near the resonant frequency of the circuit which includes the inductance 53. In the illustrative embodiment and by way of example, this frequency may be 24.75 mc. An additional trap circuit may be coupled to the inductance 83 if this is desirable or necessary, coupling being effected as described in connection with the inductance 53 for example.

The inductance 83 serves as a low resistance discharge path for the condenser 82. Since its inductance has a relatively low value, the resonant circuit in which it is included is, in the given example, tuned to a frequency of 24.75 mc. Such an inductance will have a negligibly low ohmic resistance. A noise pulse charging the condenser 82 will not be differentiated, but the condenser 28 will be discharged at once through the negligible resistance of the inductance 83. There is thus no after effect of noise pulses.

The connection of the cathode 86 of the tube 21 provides a degenerative circuit for rejection of the accompanying sound intermediate frequency carrier. This is accomplished in accordance with the invention by an inductance 88 and a capacitance 89 which is coupled to an inductance 91 directly in the cathode circuit of the tube 21. The primary inductance 91 is largely tuned out by the capacitive component of the RC combination 93 and 94 to reduce degeneration at the pass band frequencies. The cathode circuit is therefore, in accordance with the invention, highly degenerative for signals which are adjacent to the sound carrier intermediate frequency. In the illustrative example, the latter is 21.25 mc.

The plate circuit of the tube 21 contains a load resistor 96 to which a coupling condenser 98 is connected. The coupling condenser 98 serves to couple the video second detector (not shown) by way of the previously mentioned connection 24 to the tube 21. The connection 24 is bridged by an impedance comprising a tuned inductance 101 which is tunable by means of a magnetic core 102. The resonant circuit which includes the inductance 101 and the inter-electrode capacity of the tube 21 and other circuit capacities including the second detector (not shown) is tuned to a frequency which is approximately at the center of the pass band for the entire amplifier heretofore designated by the general reference character 16. In the illustrative embodiment and by way of example, the tuned circuit comprising the inductance 101 is tuned to a frequency of 23.31 mc.

The inductance 101 like the inductance 83 has a negligibly low ohmic resistance and serves immediately to discharge the coupling condenser 98 if it becomes charged as a result of the reception of a noise pulse. Cascading of stages as shown has the effect of materially reducing effect of noise pulses on an image producing device.

In each case the coupling capacitors 43, 63, 76, 82, and 98 are large in comparison with the inter-electrode and other stray circuit capacitances tuning the respective inductances. Therefore, it makes little or no difference on which side of the coupling capacitor the inductance is connected insofar as the resonant condition is concerned. The capacitors 43, 63, 76, 82, and 98 are provided solely to block the D. C. voltage on the plate from the following grid.

It will be seen from the foregoing description of the arrangement of Fig. 1 that a novel intermediate frequency amplifier having a band pass characteristic is provided without the need for special networks having critical components. Moreover, it will be seen that the amplifier is very easy to adjust so that its over all pass band may be made to suit modern channel allocations in the television range.

Figure 3:
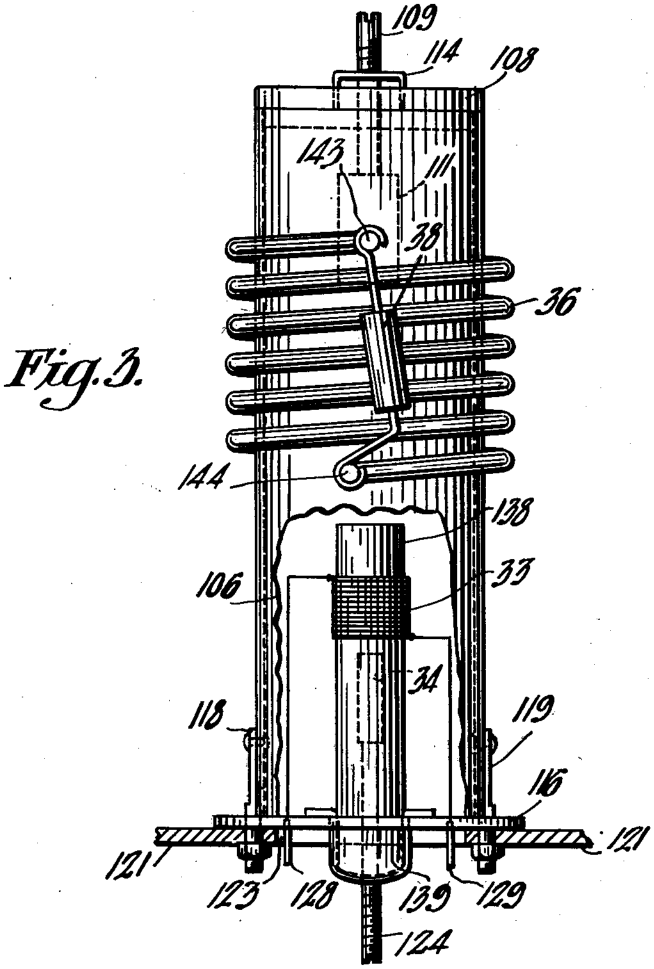
Fig. 3 is an enlarged view in side elevation, with a portion thereof broken away, of a combined coupling unit and wave trap.

The wave traps which are shown on Fig. 1 as coupled circuits require coils having a very high "Q" or inductive reactance to resistance ratio. The structure of Fig. 3 shows how the high "Q" of the trap is obtained in accordance with this invention. A coil form 106, preferably cylindrical, is provided at one end with a support 108 for the stem 109 of a magnetic core 111. This core 111 may correspond with the core employed to tune the high Q trap comprising the inductance 36 and the capacitance 38 and is so designated on Fig. 1. It will be understood, however, that the structure now to be described may be employed at any of the five interstage positions shown in Fig. 1 in which a wave trap is desirable or necessary to serve as an attenuation for the sound carrier or image carriers having adjacent allocations. The support 108 may, as shown, be in the form of a disc closing the end of the coil form 106 which positions a threaded bracket 114. The opposite end of the form 106 is secured to a terminal board 116 which may be a relatively thin sheet of electrically insulating material. Bolt connections in the form of spade bolts 118 and 119 secure the form 106 to the terminal board 116 and also to a general support for the equipment such as the chassis base 121 of a television receiver. The base 121 is apertured at this point, as indicated by reference character 123, to accommodate the adjusting stem 124 of the tuning core 34. Also, the aperture 123 accommodates such terminal connections as may be required, for example, terminal connectors 128 and 129 of the coil 33. The coil 33 may, it will be understood, also serve as the coil 53, 66, etc. of Fig. 1.

Figure 4:
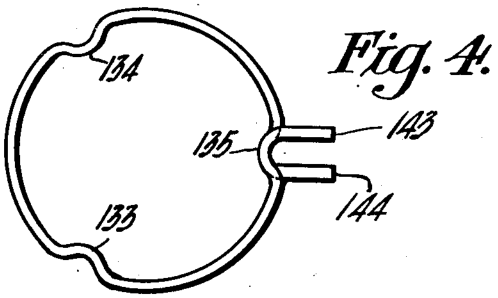
Fig. 4 shows a detail of the apparatus of Fig. 3.

The coil 36, when constructed and supported as shown in Fig. 3 of the drawings, has a "Q" in the neighborhood of 250. The coil 36 is self-supporting and is formed of relatively large diameter wire. The turns of the coil 36 are crimped as indicated at 133, 134, and 135 (Fig. 4) to produce sharp protrusions extending radially inwardly which serve to support the coil on the form 106 so that it is spaced from this form thereby minimizing capacity loss which would otherwise result from the use of a relatively poor di-electric material. The condenser 38 may be carried by the coil ends 143 and 144. Suitable connections (not shown) may if desired be carried to the terminal board 116. The coil 33 is supported on a smaller coil form 138 which is seated in a cap member or bracket 139 which provides threaded support for the adjusting stem 124.

Having now described the invention, what is claimed and desired to be secured by Letters Patent is the following:

1. A multistage amplifier for a modulated signal having a wide-band response characteristic, the last stage of the amplifier having means including a coupling condenser for coupling the amplifier to a demodulating device, each stage comprising an amplifying tube, each tube having at least a cathode, a control electrode and an anode, coupling circuits each including a blocking condenser for coupling the grid of a tube to the plate of a preceding tube, a direct connection from the grid of an advanced stage tube in said amplifier to the point of zero A. C. potential in said circuit, said direct connection consisting essentially of an inductance of negligible ohmic resistance, and a direct connection from said demodulator coupling means beyond the coupling condenser therein to the point of zero A. C. potential in said amplifier, said second named direct connection also including only an inductance of negligible ohmic resistance, whereby said later stage coupling and said demodulator coupling means will have a low time constant response to amplified noise pulse signals substantially to eliminate the after effect of a noise pulse.

2. In an amplifier, a vacuum tube having a cathode, an anode and a control electrode, means comprising an input circuit for applying signals to said control electrode, coupling means in said anode circuit, a circuit connected to said cathode comprising an inductance, and a resistance and capacitance combination in series with said inductance, a trap circuit inductively coupled to said inductance, said inductance being substantially tuned out by the capacitive component of said resistance and capacitance combination to reduce degeneration at pass band frequencies, said cathode circuit being highly degenerative for a selected frequency band.

JOHN C. ACHENBACH.
SIMEON I. TOURSHOU.
DONALD MACKEY.

REFERENCES CITED

The following references are of record in the file of this patent:

8

UNITED STATES PATENTS

| Number | Name | Date |
|---|---|---|
| 2,038,879 | Williams | Apr. 28, 1936 |
| 2,207,796 | Grundmann | July 16, 1940 |
| 2,221,217 | Kirk et al. | Nov. 12, 1940 |
| 2,268,672 | Plebanski | Jan. 6, 1942 |
| 2,321,291 | Grundmann | June 8, 1943 |
| 2,351,934 | Kramolin | June 20, 1944 |
| 2,491,326 | Moe | Dec. 13, 1949 |

OTHER REFERENCES

Radio Engineer's Handbook, Terman (McGraw-Hill Book Co.), first edition, 1943 (pages 442–443, Fig. 74).